(12) United States Patent
Gill et al.

(10) Patent No.: US 8,480,302 B2
(45) Date of Patent: Jul. 9, 2013

(54) MICRO-ELECTRO-MECHANICAL-SYSTEM TEMPERATURE SENSOR

(75) Inventors: Jason P. Gill, Essex Junction, VT (US); David L. Harmon, Essex Junction, VT (US); Timothy D. Sullivan, Underhill, VT (US)

(73) Assignee: International Business Machines Corporation, Armonk, NY (US)

( * ) Notice: Subject to any disclaimer, the term of this patent is extended or adjusted under 35 U.S.C. 154(b) by 345 days.

(21) Appl. No.: 12/892,406

(22) Filed: Sep. 28, 2010

(65) Prior Publication Data

US 2012/0076172 A1     Mar. 29, 2012

(51) Int. Cl.
    G01K 5/00    (2006.01)
    G01K 7/00    (2006.01)

(52) U.S. Cl.
    USPC ............ 374/187; 374/163; 374/199; 374/55; 374/208; 374/141

(58) Field of Classification Search
    USPC ............ 374/43–45, 100, 141, 199, 208, 187, 374/163, 46, 55
    See application file for complete search history.

(56) References Cited

U.S. PATENT DOCUMENTS

| | | | |
|---|---|---|---|
| 5,025,346 A * | 6/1991 | Tang et al. | 361/283.1 |
| 6,859,120 B2 * | 2/2005 | Sweatt et al. | 335/78 |
| 7,239,064 B1 | 7/2007 | Jenkins et al. | |
| 7,948,335 B2 * | 5/2011 | Sherrer et al. | 333/244 |
| 2006/0077519 A1 * | 4/2006 | Floyd | 359/290 |
| 2008/0104544 A1 * | 5/2008 | Collins et al. | 715/846 |
| 2009/0180516 A1 * | 7/2009 | Den Toonder et al. | 374/187 |
| 2009/0312954 A1 * | 12/2009 | Utriainen | 702/23 |
| 2011/0110394 A1 * | 5/2011 | Kaess et al. | 374/121 |
| 2011/0150031 A1 * | 6/2011 | Abdelmoneum et al. | 374/117 |
| 2011/0155913 A1 * | 6/2011 | Noguchi et al. | 250/338.3 |
| 2011/0182320 A1 * | 7/2011 | Noda | 374/121 |
| 2011/0268148 A1 * | 11/2011 | King et al. | 374/31 |
| 2012/0019956 A1 * | 1/2012 | Poorman et al. | 360/77.01 |

* cited by examiner

Primary Examiner — Gail Verbitsky
(74) Attorney, Agent, or Firm — Scully, Scott, Murphy & Presser, P.C.; Anthony J. Canale (57) ABSTRACT

The present invention provides a micro-electro-mechanical-system (MEMS) temperature sensor that employs a suspended spiral comprising a material with a positive coefficient of thermal expansion. The thermal expansion of the suspended spiral is guided to by a set of guideposts to provide a linear movement of the free end of the suspended spiral, which is converted to an electrical signal by a set of conductive rotor azimuthal fins that are interdigitated with a set of conductive stator azimuthal fins by measuring the amount of capacitive coupling therebetween. Real time temperature may thus be measured through the in-situ measurement of the capacitive coupling. Optionally, the MEMS temperature sensor may have a ratchet and a pawl to enable ex-situ measurement.

15 Claims, 11 Drawing Sheets

MICRO-ELECTRO-MECHANICAL-SYSTEM TEMPERATURE SENSOR

FIELD OF THE INVENTION

The present invention relates to a micro-electro-mechanical-system (MEMS) temperature sensor, and particularly to an MEMS temperature sensor capable of in-situ or ex-situ temperature measurement, and methods of manufacturing the same.

BACKGROUND

Temperature sensing for monitoring or diagnosing performance of a device or a system is difficult or impractical in various industrial applications. For example, in-situ measurement of substrate temperature during processing of microelectronic circuits is usually difficult and time consuming, and in many cases impossible. Such processing steps include thermal anneal, plasma clean, baking, pre-heating, pre-cooling, etc.

Currently known methods for conducting such temperature measurements employ thermocouple wires. Typically, a pair of thermocouple wires is attached to a substrate. The substrate is then placed in the fabrication tool of interest. The thermocouple wires are routed to an instrument outside the tool through a feedthrough port or a gap between sealed surfaces. The instrument records the sensed temperature during tool operation. This approach has several disadvantages. First, it is intrusive to the usual environment within the tool, and may alter the environment sufficiently that the resultant measurements are unrepresentative of the actual conditions when the thermocouple wafer is not present. Second, the tool can not be used for the time required to obtain the data, which may extend for several hours. Third, interruption of the usual tool operation cycle and frequency may require additional time to restabilize the tool for production. Fourth, for some tools, the usual operating sequence may have to be bypassed in order to accomplish the measurement (for example, moving robots, etc. may have to be disabled). In some cases, the structure of the tool prohibits access to the process chamber during operation, so that the measurement cannot be made at all.

Therefore, there exists a need for a micro-electro-mechanical-system (MEMS) temperature sensor that enables in-situ or ex-situ temperature measurement of a system without employing thermocouple wires over a wide temperature range.

SUMMARY

The present invention provides a micro-electro-mechanical-system (MEMS) temperature sensor that employs a suspended spiral comprising a material with a positive coefficient of thermal expansion. The thermal expansion of the suspended spiral is guided to by a set of guideposts to provide a linear movement of the free end of the suspended spiral, which is captured by a receptor attached to an outer azimuthal fin of an actuator that pivots around a fixed pivoting point. The actuator includes a set of conductive rotor azimuthal fins that are attached to the arm of the actuator and interdigitated with a set of conductive stator azimuthal fins. The set of conductive rotor azimuthal fins is electrically connected to a first conductive pad through the arm of the actuator and a first feedthrough. The set of conductive stator azimuthal fins is electrically connected to a second conductive pad through a second feed through. In-situ measurement of the temperature of a system may be made by measuring the amount of capacitive coupling between the set of conductive rotor azimuthal fins and the set of conductive stator azimuthal fins.

The MEMS temperature sensor may have an optional ratchet that comprises the outer azimuthal fin and a set of teeth located on an outer surface thereof. A pawl pressing against the ratchet allows a unidirectional movement of the azimuthal fin so that the peak temperature of a system may be detected ex-situ without employing any probe during the thermal exposure. At least one suspension support spring may be attached to a moving portion of the actuator to reduce sagging of the actuator.

The moving parts of the MEMS temperature sensor may be formed by patterning a conductive material layer in the pattern of the moving part, and then undercutting the material directly underneath the moving parts, for example, by a wet etch. The fixed parts of the MEMS temperature sensor may be formed by preventing the undercutting of the material directly underneath the fixed parts. The MEMS temperature sensor may be sealed at the top and at the bottom to provide mechanical protection.

According to an aspect of the present invention, a micro-electro-mechanical-structure (MEMS) temperature sensor is provided, which comprises:

a suspended spiral comprising a material having a positive thermal expansion coefficient, wherein a central end of the suspended spiral is fixed to a substrate and a peripheral end of the suspended spiral moves upon thermal expansion;

an actuator configured to be azimuthally rotated about a pivot point by the peripheral end of the suspended spiral and including a set of at least one conductive rotor azimuthal fin; and a set of at least one conductive stator azimuthal fin that is fixed to the substrate, wherein capacitance between the set of at least one conductive rotor azimuthal fin and the set of at least one conductive stator azimuthal fin varies with an azimuthal rotation of the actuator.

In one embodiment, the MEMS temperature sensor further comprises at least one guide post that guides the peripheral end of the suspended spiral to provide a linear movement of the peripheral end.

In another embodiment, the MEMS temperature sensor further comprises:

a first conductive pad electrically connected to the at least one conductive rotor azimuthal fin; and a second conductive pad electrically connected to the at least one conductive stator azimuthal fin.

In even another embodiment, the set of at least one conductive rotor azimuthal fin and the set of at least one conductive stator azimuthal fin are interdigitated, and wherein all of the at least one conductive rotor azimuthal fin and the at least one conductive stator azimuthal fin have a same center of curvature.

In yet another embodiment, the MEMS temperature sensor further comprises:

a ratchet located on an azimuthal fin attached to a radial arm of the actuator and comprising a set of asymmetrical teeth; and a pawl configured to allow a unidirectional motion of the ratchet and to stop the ratchet from moving in an opposite direction.

In still another embodiment, the MEMS temperature sensor further comprises at least one suspension support spring attached to the actuator to reduce sagging of the actuator.

In a further embodiment, the MEMS temperature sensor further comprises an enclosure including a set of enclosure sidewalls, the substrate, and a top cover overlying the suspended spiral, the actuator, and the set of at least one conductive stator azimuthal fin.

In a yet further embodiment, the MEMS temperature sensor further comprises a capture cup located at an end portion of an azimuthal fin which is attached to a radial arm of the actuator, wherein a concave surface of the capture cup confines a lateral movement of the peripheral end of the suspended spiral.

In a still further embodiment, the pivot point is located in a pivot structure including a vertical stack of a lower pivot structure comprising a first conductive material and an upper pivot structure comprising a second conductive material, wherein the pivot structure is fixed to the substrate, and wherein the suspended spiral, the set of at least one conductive rotor azimuthal fin, and the set of at least one conductive stator azimuthal fin comprise the second conductive material.

According to another aspect of the present invention, a method of forming a micro-electro-mechanical-structure (MEMS) temperature sensor is provided. The method comprises:

forming a first dielectric material layer on a substrate;

depositing and patterning a first conductive material layer to form first conductive material portions;

depositing a second dielectric material layer over the first conductive material portions;

depositing and patterning a second conductive material layer to form second conductive material portions, wherein a first subset of the second conductive material portions vertically abut one of the first conductive material portions, and wherein a second subset of the second conductive material portions does not overlie the first conductive material portions; and etching the second dielectric material layer selective to the first and second conductive material portions, wherein the second subset of the second conductive material portions include a suspended spiral, an actuator configured to be azimuthally rotated about a pivot point by a peripheral end of the suspended spiral, and a variable capacitor of which the capacitance varies with a movement of the actuator.

In one embodiment, the suspended spiral comprises a material having a positive thermal expansion coefficient, wherein a central end of the suspended spiral is fixed to the substrate and the peripheral end of the suspended spiral moves upon thermal expansion.

In another embodiment, the variable capacitor includes:

a set of at least one conductive rotor azimuthal fin attached to a radial arm of the actuator; and a set of at least one conductive stator azimuthal fin that is fixed to the substrate, wherein capacitance between the set of at least one conductive rotor azimuthal fin and the set of at least one conductive stator azimuthal fin varies with an azimuthal rotation of the actuator.

In yet another embodiment, the method further comprises:

depositing a third dielectric material layer on the second conductive material portions;

depositing an encapsulating material layer on the third dielectric material layer; and etching the third dielectric material layer selective to the first and second conductive material portions.

In still another embodiment, the second and third dielectric material layer comprises silicon oxide, and wherein the second conductive material layer comprises a doped polysilicon, a doped silicon-containing semiconductor alloy, or a metallic material.

DETAILED DESCRIPTION

As stated above, the present invention relates to micro-electro-mechanical-system (MEMS) temperature sensor, and particularly to an MEMS temperature sensor capable of in-situ or ex-situ temperature measurement, and methods of manufacturing the same, which are described herein with accompanying figures. As used herein, when introducing elements of the present invention or the preferred embodiments thereof, the articles "a", "an", "the" and "said" are intended to mean that there are one or more of the elements. Throughout the drawings, the same reference numerals or letters are used to designate like or equivalent elements. Detailed descriptions of known functions and constructions unnecessarily obscuring the subject matter of the present invention have been omitted for clarity. The drawings are not necessarily drawn to scale.

As used herein, a structural element is referred to as being "on" another structural element when the structural element is located directly on the other structural element or when a set of at least one intervening element making direct physical contact with the structural element and the other structural element is present. A structural element is referred to as being "directly on" another structural element when there is no intervening structural element and a physical contact is formed between the structural element and the other structural element. An element "abuts" another element when a physical interface area providing a direct contact is present between the element and the other element.

Figure 1:
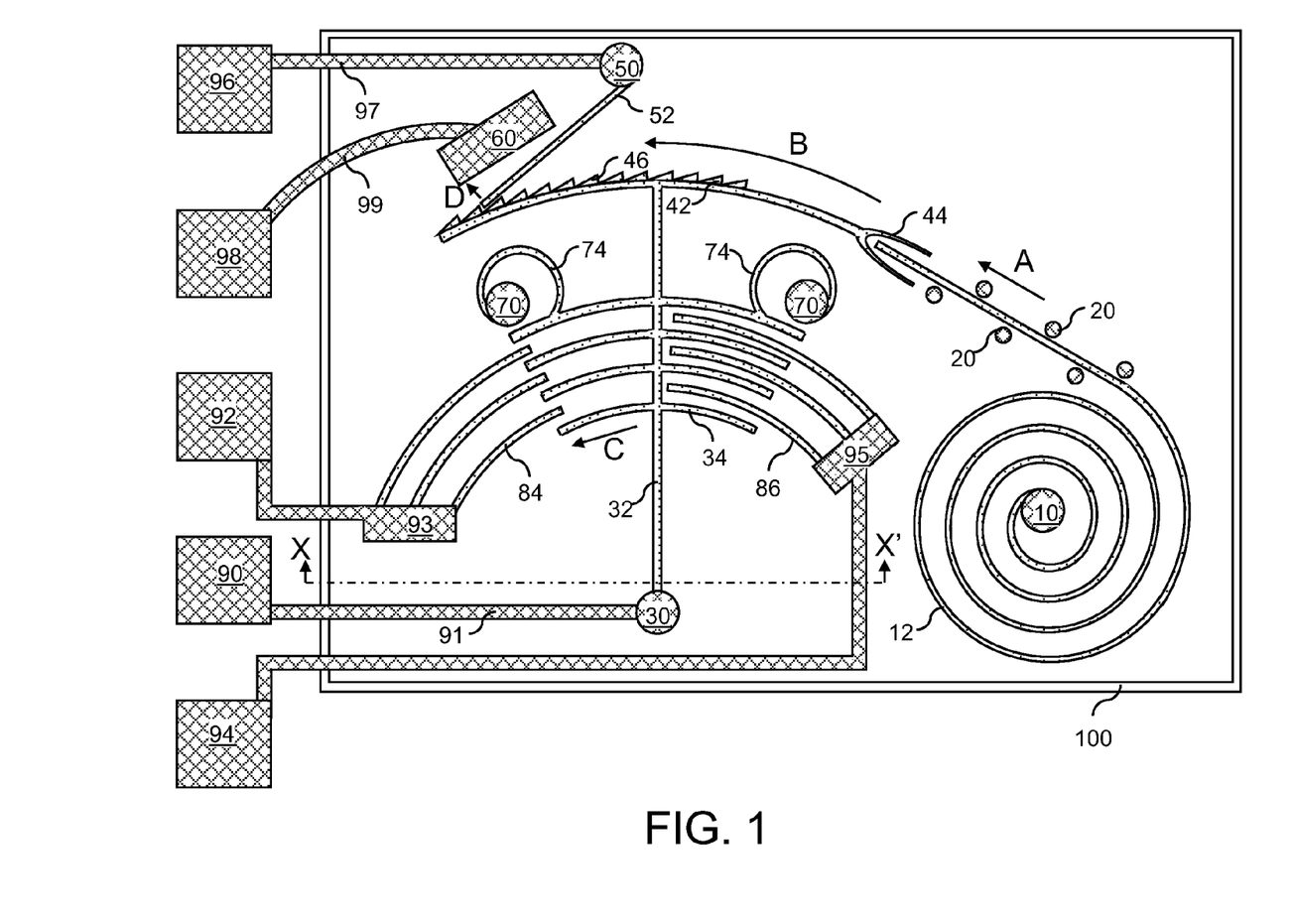
FIG. 1 is a schematic horizontal cross-sectional view of an exemplary micro-electrical-mechanical-system (MEMS) temperature sensor of the present invention at a horizontal plane containing a suspended spiral. The number of turns and the relative dimensions may not be representative of true number of turns in the suspended spiral and the true relative dimensions in the exemplary MEMS temperature sensor of the present invention.

Referring to FIG. 1, an exemplary micro-electrical-mechanical-system (MEMS) temperature sensor of the present invention is schematically shown in a horizontal cross-sectional view. At an elevated temperature, a suspended spiral 12 is elongated due to thermal expansion. This thermal expansion induces a peripheral end of the suspended spiral 12 to push on an azimuthal fin 42 of an actuator, which pivots counterclockwise about a pivot point in the pivot structure 30. The actuator includes a radial arm 32, a set of at least one conductive rotor azimuthal fin 34, the azimuthal fin 42, a capture cup 44, and a ratchet 46.

The change in the position of the actuator induces a change in a first capacitance between the set of at least one conductive rotor azimuthal fin 34 attached to a radial arm 32 of the actuator and a set of at least one first conductive stator azimuthal fin 84. Further, the change in the position of the actuator also induces a change in a second capacitance between the set of at least one conductive rotor azimuthal fin 34 and a set of at least one second conductive stator azimuthal fin 86. The set of at least one conductive rotor azimuthal fin 34 and set of at least one first conductive stator azimuthal fin 84 collectively constitute a first variable capacitor (34, 84), and the set of at least one conductive rotor azimuthal fin 34 and set of at least one second conductive stator azimuthal fin 86 collectively constitute a second variable capacitor (34, 86).

Once calibration is established by correlating the capacitance measurement data with temperature in a known temperature setting, the first and/or second capacitance can be directly converted into a temperature. In one embodiment, the set of at least one first conductive stator azimuthal fin 84 may be formed, while the set of at least one second conductive stator azimuthal fin 86 is not formed. In another embodiment, the set of at least one second conductive stator azimuthal fin 86 may be formed, while the set of at least one first conductive stator azimuthal fin 86 is not formed. In yet another embodiment, the set of at least one first conductive stator azimuthal fin 84 and the set of at least one second conductive stator azimuthal fin 86 may be formed.

An optional locking mechanism comprising a ratchet 46 and a pawl 52 allows ex-situ measurement of peak temperature. The locking mechanism allows counterclockwise rotation of the actuator, while preventing a clockwise rotation of the actuator. Thus, once the actuator rotates by an azimuthal angle corresponding to the peak temperature during a measurement, the actuator, including the set of at least one conductive rotor azimuthal fin 34, is locked at the position corresponding to the peak temperature. The MEMS temperature sensor may be measured on a tester ex-situ to determine the peak temperature during the testing.

Globally, the exemplary MEMS temperature sensor includes first conductive material portions comprising a first conductive material and second conductive material portions comprising a second conductive material. Each of the first conductive material portions underlies one of the second conductive material portions. Some of the second conductive material portions do not overlie any first conductive material portion. It is understood that lithographic overlay variations introduced in a manufacturing process may cause a sub-portion of a first conductive material portion to be located outside the areas covered by the second conductive material portions. Even in such cases, another sub-portion of the first conductive material portion laterally abutting the non-underlying sub-portion directly underlies, i.e., is located directly underneath, a second conductive material portion.

Dotted areas in FIG. 1 represent areas within the MEMS temperature sensor that are occupied only by the second conductive material portions and not by the first conductive material portions. Cross-hatched areas in FIG. 1 represent areas within the MEMS temperature sensor that are occupied by a stack of a second conductive material portion and an underlying first conductive material portion. The second conductive material portions are vertically separated from a substrate on which the MEMS temperature sensor is located. All second conductive material portions are therefore "suspended," i.e., do not make any directly contact with the substrate and make contact with the substrate only through a first conductive material portion. Therefore, all second conductive material portions are vertically separated from the substrate, i.e., bottom surfaces of the second conductive material portions do not touch any structure.

The MEMS temperature sensor includes a suspended spiral 12 which comprises the second conductive material. A central end of the suspended spiral 12 is fixed to a substrate (not shown) through a spiral center post 10 and a peripheral end of the suspended spiral 12 moves upon thermal expansion. The spiral center post comprises a lower spiral center post portion (not shown) which is a first conductive material portion and an upper spiral center post portion (not shown) which is a second conductive material portion vertically abutting the lower spiral center post portion. The suspended spiral 12 is schematically drawn so that the number of turns and the relative dimensions of the suspended spiral 12 may vary depending on the selection of material and the size of the suspended spiral 12. The suspended spiral 12 is a second conductive material portion. Thus, the suspended spiral 12 and the upper spiral center post portion 12 comprise the second conductive material.

The second conductive material has a positive thermal expansion coefficient. Materials that may be employed as the second conductive material include doped semiconductor materials and metallic materials. Exemplary doped semiconductor materials include, but are not limited to, doped silicon, doped germanium, doped silicon-germanium alloy, doped silicon carbon alloy, doped silicon-germanium-carbon alloy, doped gallium arsenide, doped indium arsenide, doped indium phosphide, doped III-V compound semiconductor materials, doped II-VI compound semiconductor materials, doped organic semiconductor materials, and other doped compound semiconductor materials. Particularly, doped polysilicon and a doped silicon-containing semiconductor alloy may be employed for the second conductive material. Exemplary metallic materials include, but are not limited to, elemental metals, intermetallic alloys of at least two elemental metals, conductive metallic nitrides, conductive metallic oxides, and combinations thereof. Particularly, W, Cu, Al, Ta, Ti, TaN, or TiN may be employed as the second conductive material.

Thermal expansion of the suspended spiral 12 may be optimized to facilitate the measurement of the first capacitance and/or the second capacitance. In an exemplary embodiment, 50 µm of displacement of the set of at least one conductive rotor azimuthal fin 34 may be targeted. The change in the first and second capacitance per micron of displacement is affected by the design of the first variable capacitor (34, 84) and the second variable capacitor (34, 86). Particularly relevant design factors include the number of conductive rotor/stator azimuthal fins, the height of each conductive rotor/stator azimuthal fin, the gap between adjacent conductive rotor/stator azimuthal fins, etc. Employing currently available manufacturing methods, a capacitance change per micron of displacement on the order of 10 fF/µm may be readily achieved. In an exemplary design in which 50 µm of displacement is spread over a temperature change of 600° C., the capacitance change per degree is 0.8 fF/° C. The temperature sensitivity can easily be "tuned" around particular temperatures, by altering the design parameters of the exemplary MEMS temperature sensor. A silicon nitride layer (not shown), which is vertically separated from the suspended spiral 12 and underlying the suspended spiral 12, may be provided on a top surface of the substrate to increase sliding of the suspended spiral 12 in case the suspended spiral sags due to gravity.

For low temperature measurement, the suspended spiral 12 may be attached to the azimuthal fin 42, and mirror images of the first variable capacitor (34, 84) and the second variable capacitor (34, 86) may be employed. In this case, the direction of the ratchet 46 and the pawl 52 is also reversed to measure the minimum temperature during the temperature measurement.

In an exemplary design for the suspended spiral 12, the suspended spiral 12 may consist essentially of doped polysilicon, which has a thermal expansion coefficient of $4.68 \times 10^{-6}$ per degree Celsius. About 20,000 µm of linear structure of suspended spiral 12 induces about 50 µm of displacement over a temperature variation of 600° C. The precise thermal expansion of the doped polysilicon may be reduced due to friction, which may be minimized by good structure design of the suspended spiral 12. The total length of the suspended spiral 12 may be defined in terms of the starting radius, the pitch, and the number of turns in the suspended spiral 12. Using a starting radius of about 20 µm, and a pitch of 6 µm, a suspended spiral 12 in the form of a coil with 30 turns would provide the necessary 20,000 μm of length and result in a radius of about 200 μm at a peripheral end.

The peripheral end of the suspended spiral 12 is guided by at least one guide post 20, each of which comprises a stack of a lower guide post portion comprising the first conductive material and an upper guide post portion comprising the second conductive material. The at least one guide post 20 is fixed to the substrate, and confines the lateral movement of the suspended spiral 12 so that the peripheral end of the suspended spiral 12 moves linearly along the direction of the channel, which is indicated by an arrow labeled "A," defined by the at least one guide post 20.

The actuator (32, 34, 42, 44, 46) is provided in the path of the linear movement of the peripheral end of the suspended spiral 12. The entirety of the actuator (32, 34, 42, 44, 46) is of integral and unitary construction, i.e., formed as a single contiguous structure in one piece. The capture cup 44 located at an end portion of the azimuthal fin 42 includes a concave surface, which confines the lateral movement of the peripheral end of the suspended spiral 12. The capture cup 44 is a second conductive material portion comprising the second conductive material, and is vertically separated form the substrate.

The azimuthal fin 42 is attached to the radial arm 32 of the actuator (32, 34, 42, 44, 46), which pivots about a pivot point located in a pivot structure 30. Specifically, the pivot point is located on the sidewall of an upper pivot structure portion comprising the second conductive material within the pivot structure, which also includes a lower pivot structure portion comprising the first conductive material. The actuator (32, 34, 42, 44, 46) and the suspended spiral comprise the second conductive material, and are vertically separated from the substrate. The pivot structure 30 laterally supports the actuator (32, 34, 42, 44, 46), and is fixed to the substrate.

The linear movement of the peripheral end of the suspended spiral 12 is thus translated into a rotational movement of the actuator (32, 34, 42, 44, 46) through the capture cup 44, the azimuthal fin, and the radial arm 32. Thus, the guided linear movement of the free end of the suspended spiral 12 induces an azimuthal movement, i.e., a rotation, of the actuator (32, 34, 42, 44, 46) in the counterclockwise direction, which is indicated by the arrow labeled "B."

The set of at least one conductive rotor azimuthal fin 34 and the set of at least one first conductive stator azimuthal fin 84 constitute a first interdigitated comb structure that functions as the first variable capacitor (34, 84). The set of at least one conductive rotor azimuthal fin 34 and the set of at least one second conductive stator azimuthal fin 86 constitute a second interdigitated comb structure that functions as the second variable capacitor (34, 86). Each of the at least one conductive rotor azimuthal fin 34 and the at least one first conductive stator azimuthal fin 84 has a different radius of curvature. Each of the at least one conductive rotor azimuthal fin 34 and the at least one second conductive stator azimuthal fin 86 has a different radius of curvature. Preferably, the radius of curvature is maintained constant within each conductive stator/rotor azimuthal fin (34, 84, 86) so that each conductive stator/rotor azimuthal fin (34, 84, 86) forms an arc around the common pivot point. Preferably, all of the at least one conductive rotor azimuthal fin 34 and the at least one first and second conductive stator azimuthal fin (84, 86) have a same center of curvature, which is the pivot point of the actuator (32, 34, 42, 44, 46).

During testing, as the temperature increases and the suspended spiral 12 expands, the actuator (32, 34, 42, 44, 46) rotates, thereby changing the overlap between the set of at least one conductive rotor azimuthal fin 34 and the set of at least one first conductive stator azimuthal fin 84. At the same time, the overlap between the set of at least one conductive rotor azimuthal fin 34 and the set of at least one second conductive stator azimuthal fin 84 is also changed. The first interdigitated comb structure is configured to increase the first capacitance, i.e., the capacitance of the first variable capacitor (34, 84), with an increase in temperature. The second interdigitated comb structure is configured to decrease the second capacitance, i.e., the capacitance of the second variable capacitor (34, 86), with an increase in temperature. As discussed above, each of the first and second interdigitated comb structure may be employed singly without the other, or may be employed in combination in various embodiments.

The MEMS temperature sensor includes a first conductive pad 90, a second conductive pad 92, and a third conductive pad 94. The first conductive pad 90 is electrically connected to the actuator (32, 34, 42, 44, 46) through the pivot structure 30 and a first conductive strap 91. The second conductive pad 92 is electrically connected to the set of at least one first conductive stator azimuthal fin 84 through a second conductive strap 93. The third conductive pad 94 is connected to the set of at least one second conductive stator azimuthal fin 86 through a third conductive strap 95. The electrical connections between each of the first, second, and third conductive pads (90, 92, 94) and one of the actuator (32, 34, 42, 44, 46), the set of at least one first conductive stator azimuthal fin 84, and the set of at least one second conductive stator azimuthal fin 86 are resistive connections.

The first capacitance and/or the second capacitance may be monitored in-situ by connecting electrical wires from a tester to the first conductive pad 90 and one or both of the second and third conductive pads (92, 94). The pair of electrical wires connected to the first conductive pad 90 and the second conductive pad 92 may be employed to measure the first capacitance of the first variable capacitor (34, 84), and the pair of electrical wires connected to the first conductive pad 90 and the third conductive pad 94 may be employed to measure the second capacitance of the second variable capacitor (34, 86).

For ex-situ measurement of a maximum temperature, the position of the actuator (32, 34, 42, 44, 46) is maintained at the maximum temperature during testing by the ratchet 46 and the pawl 52 such that the measured capacitance correlates to the maximum temperature achieved. The ratchet 46 is located on the azimuthal fin 42 attached to the radial arm 32 of the actuator (32, 34, 42, 44, 46). The ratchet 46 comprises a set of asymmetrical teeth, each of which has a glancing angle slope to the left and a near right angle slope on the right side. The pawl 52 is configured to allow a unidirectional motion, i.e., the counterclockwise rotation, of the ratchet 46 and the radial arm 32. The pawl 52 stops the ratchet 46 from moving in an opposite direction, i.e., clockwise rotation.

The ratchet 46 and the pawl 52 provide a locking mechanism to detect the peak rotation of the actuator (32, 34, 42, 44, 46), which is representative of the peak temperature that the MEMS temperature sensor is exposed to. Thus, for ex-situ measurements, the recording mechanism for the peak temperature is contained within the structure of the MEMS temperature sensor. No wire or other intrusive paraphernalia are needed for the ex-situ temperature measurement, which may be performed employing a semiconductor substrate containing the MEMS temperature sensors. Thus, the semiconductor substrate including the MEMS temperature sensors may be loaded in the same manner as a product semiconductor substrate including semiconductor chips. In other words, the semiconductor substrate including the MEMS temperature sensors may be processed in the same lot with the product semiconductor substrates so that the semiconductor substrate including the MEMS temperature sensors is exposed to the same environment as the product semiconductor substrates. Since the material employed in standard CMOS processing may withstand temperatures up to 1,250° C. or above, the MEMS temperature sensor built on a semiconductor substrate employing standard CMOS processing steps may be employed to accurately measure temperatures over large temperature ranges. Ex-situ measurements of capacitance can be calibrated to obtain accurate temperature measurements.

Optionally, a ratchet reset electrode 60 may be provided so that the pawl 52 may be disengaged from the ratchet 46 by electrostatic attraction to the ratchet reset electrode 60. For example, one end of the pawl 52 may be attached to a pawl post 50 comprising a stack of a first conductive material portion and a second conductive material portion and fixed to the substrate. The ratchet reset electrode 60 is located in proximity to the pawl 52, e.g., within 5 μm, and preferably within 1 μm of the pawl 52. A fourth conductive pad 96 is connected to the pawl post 50 through a fourth conductive strap 97. A fifth conductive pad 98 is connected to the ratchet reset electrode 60 through a fifth conductive strap 99. By applying a potential difference between the fourth conductive pad 96 and the fifth conductive pad 98, the pawl 52 may be deflected toward the ratchet reset electrode 60 due to electrostatic attraction. Once the pawl 52 stops blocking the clockwise rotation of the actuator (32, 34, 42, 44, 46) at room temperature, the actuator (32, 34, 42, 44, 46) rotates clockwise to the initial position corresponding to room temperature. In this case, the release of the pawl 52 from the ratchet 46 electrically resets the actuator (32, 34, 42, 44, 46) at substrate level without resort to any intrusive mechanical means. Thus, the same substrate may be used repeatedly many times.

Optionally, the MEMS temperature sensor may comprise at least one suspension support spring 74 that is attached to the actuator (32, 34, 42, 44, 46) to reduce sagging of the actuator (32, 34, 42, 44, 46). One end of each of the at least one suspension support spring 74 is attached to the actuator (32, 34, 42, 44, 46), and the other end of each of the at least one suspension support spring 74 is attached to a support spring post 70, which comprises a vertical stack of an upper support spring post portion (not shown) comprising the first conductive material and a lower support spring portion (not shown) comprising the second conductive material. Each support spring post 70 is fixed to the substrate, and each of the at least one suspension support spring 74 is suspended above, and is separated from, the substrate by a support spring post 70.

Optionally, the MEMS temperature sensor may include an enclosure including a set of enclosure sidewalls 100, the substrate, and a top cover overlying the components of the MEMS temperature sensor described above, including the suspended spiral 12, the actuator (32, 34, 42, 44, 46), and the set of at least one first and second conductive stator azimuthal fins (84, 86). Such an enclosure protects the components of the MEMS temperature sensor from contamination by particles and/or reaction in a chemical environment.

The first through fifth conductive pads (90, 92, 94, 96, 98) may be arranged in a liner array or in a two dimensional array. Preferably, the first through fifth conductive pads (90, 92, 94, 96, 98) are arranged in the same pattern as a test pad set employed in semiconductor testing, which typically has a pitch of about 100 μm. In this case, standard test probes employed in semiconductor manufacturing may be employed for measuring the first and/or second capacitances to monitor the temperature in-situ, or to measure the peak temperature of a process ex-situ.

The entire MEMS temperature sensor structure can be fabricated using conventional MEMS techniques. The MEMS temperature sensor is small, e.g., may occupy an area less than about 1 mm$^2$. Thus, many instances of the MEMS temperature sensor may be repeated over the entire surface of a substrate. The capacitance readings may be obtained by conventional wafer test methods employing conventional probes to obtain data for temperature variation across the substrate as well as data for the peak temperature during processing.

Multiple instances of the MEMS temperature sensor may be built on a semiconductor substrate employing standard complementary metal-oxide-semiconductor (CMOS) manufacturing processes, e.g., at least one per every semiconductor chip. Thus, the MEMS temperature sensor may be manufactured with the equipment and processes already in use in semiconductor manufacturing.

An exemplary manufacturing sequence for forming the exemplary MEMS temperature sensor of FIG. 1 is illustrated in FIGS. 2-11, which are sequential schematic vertical cross-sectional views of the exemplary MEMS temperature sensor along a vertical plane X-X' in FIG. 1.

Figure 2:
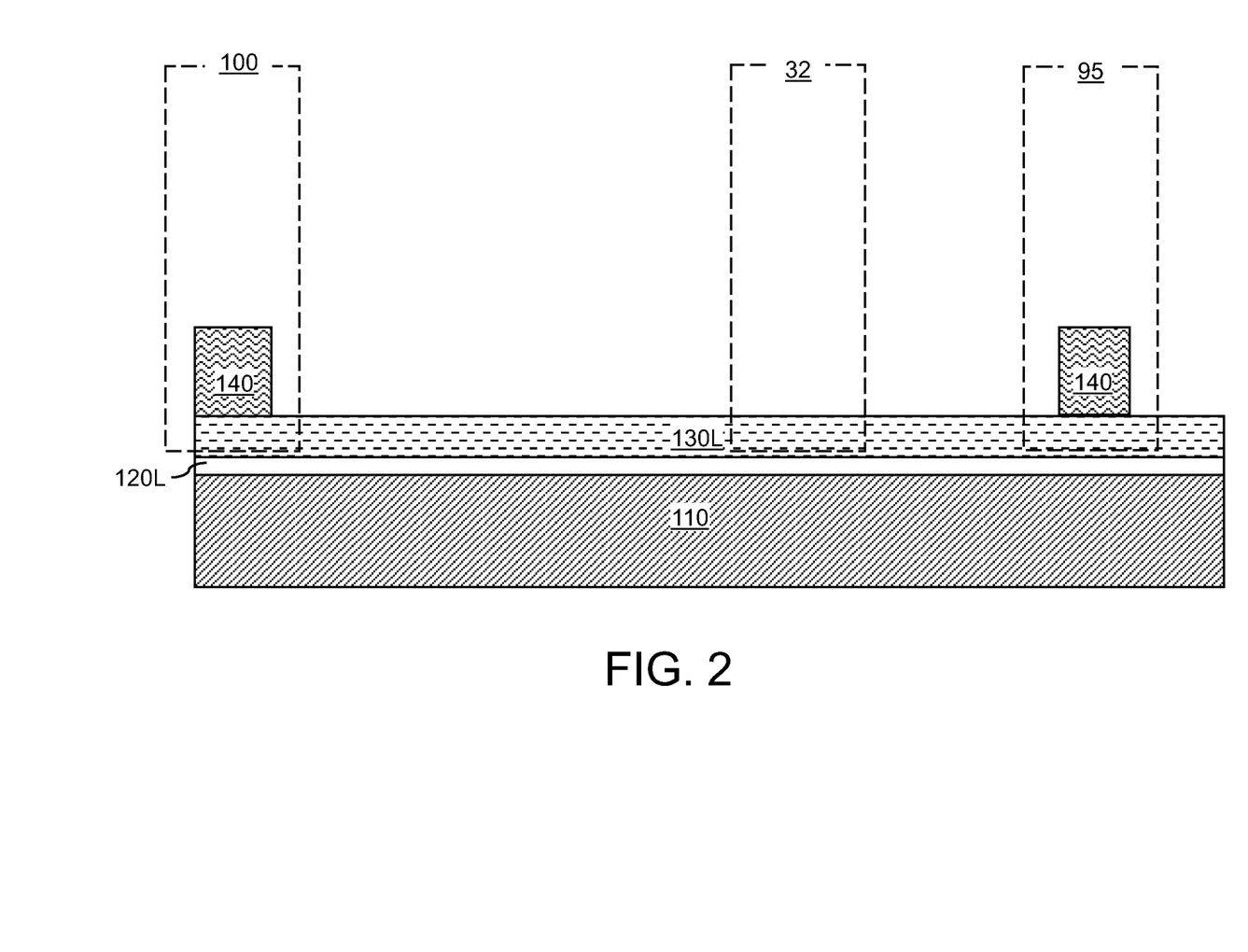
FIGS. 2-11 show sequential vertical cross-sectional views of the exemplary MEMS temperature sensor at a plane corresponding to the plane X-X' of FIG. 1 at various stages of a manufacturing process.

Referring to FIG. 2, an optional dielectric material layer 120L is formed on a substrate 110. A first dielectric material layer 130L is deposited directly on the optional dielectric material layer 120L or the substrate 110. The substrate 110 may be a semiconductor substrate, an insulator substrate, or a metallic substrate. The optional dielectric material layer 120L may be optionally formed on the substrate 110 as needed, for example, to enhance adhesion of the first dielectric material layer 130L, to reduce stress generated by the first dielectric material layer 130L, etc.

For example, the substrate 110 may be a semiconductor substrate such as a silicon substrate, the optional dielectric material layer 120L may be a silicon oxide layer, and the first dielectric material layer 130L may be a silicon nitride layer. The thicknesses of the substrate 110, the optional dielectric material layer 120L, and the first dielectric material layer 130L may be adjusted as needed. For example, the thickness of the substrate 110 may be from about 500 μm to about 1,000 μm, the thickness of the optional dielectric material layer 120L may be from about 1 nm to about 300 nm, and the thickness of the first dielectric material layer may be from about 20 nm to about 1,000 nm, although lesser and greater thicknesses are also contemplated herein.

A first conductive material layer is deposited and patterned to form the first conductive material portions 140, which are the same as the first conductive material portions of the MEMS temperatures sensor in FIG. 1. The first conductive material portions 140 comprise the first conductive material, which may be a doped semiconductor material or a metallic material. The first conductive material may be any of the material that may be employed as the second conductive material described above. For example, the first conductive material may be doped polysilicon or a metal. The thickness, or the height, of the first conductive material portions may be from about 50 nm to about 2,000 nm, and typically from about 100 nm to about 500 nm, although lesser and greater thicknesses are also contemplated herein. The region corresponding to an enclosure sidewall 100, the region corresponding to the radial arm 32 of the actuator (32, 34, 42, 44, 46), and the region corresponding to the third conductive strap 95 are shown by dotted rectangles.

The first conductive material portions 140 comprise the first conductive material, and constitutes lower portions of all fixed structures of the exemplary MEMS temperature sensor of FIG. 1, including the spiral center post 10, the at least one guide post 20, the pivot structure 30, the paw post 50, the ratchet reset electrode 60, the at least one support spring post 70, the first through fifth conductive straps (91, 93, 95, 97, 99), and the first through fifth conductive pads (90, 92, 94, 96, 98).

Figure 3:
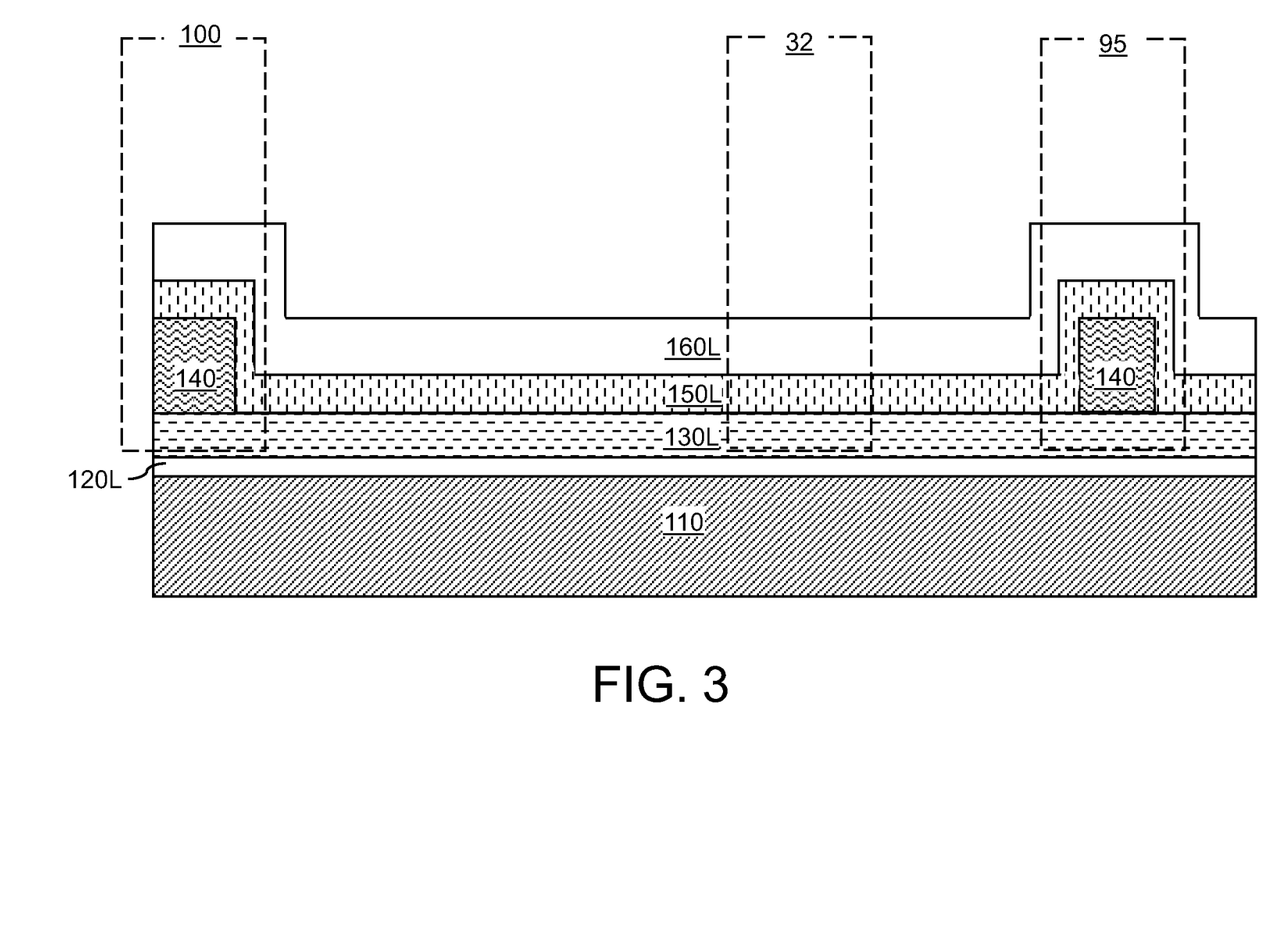

Referring to FIG. 3, an etch stop dielectric layer 150L is deposited over the first conductive material portions 140 and exposed surfaces of the first dielectric material layer 150L. The etch stop dielectric material layer 150L comprises a dielectric material that is resistant to the chemistry of a wet etch to be subsequently employed to remove other dielectric material layers, which are formed over the etch stop dielectric layer 150L prior to the etching.

A second dielectric material layer 160L is deposited over the first conductive material portions 140. The second dielectric material layer 160L comprise a dielectric material that may be removed selective to the material of the etch stop dielectric material layer 150L by a wet etch. For example, the etch stop dielectric material layer 150L may comprise silicon nitride, and the second dielectric material layer 160L may comprise silicon oxide. Preferably, the thickness of the second dielectric material layer 160L is selected so that the top surface of the second dielectric material layer in a region that does not include any of the first conductive material portions 140 is substantially coplanar with the top surfaces of the first conductive material portion 140.

Figure 4:
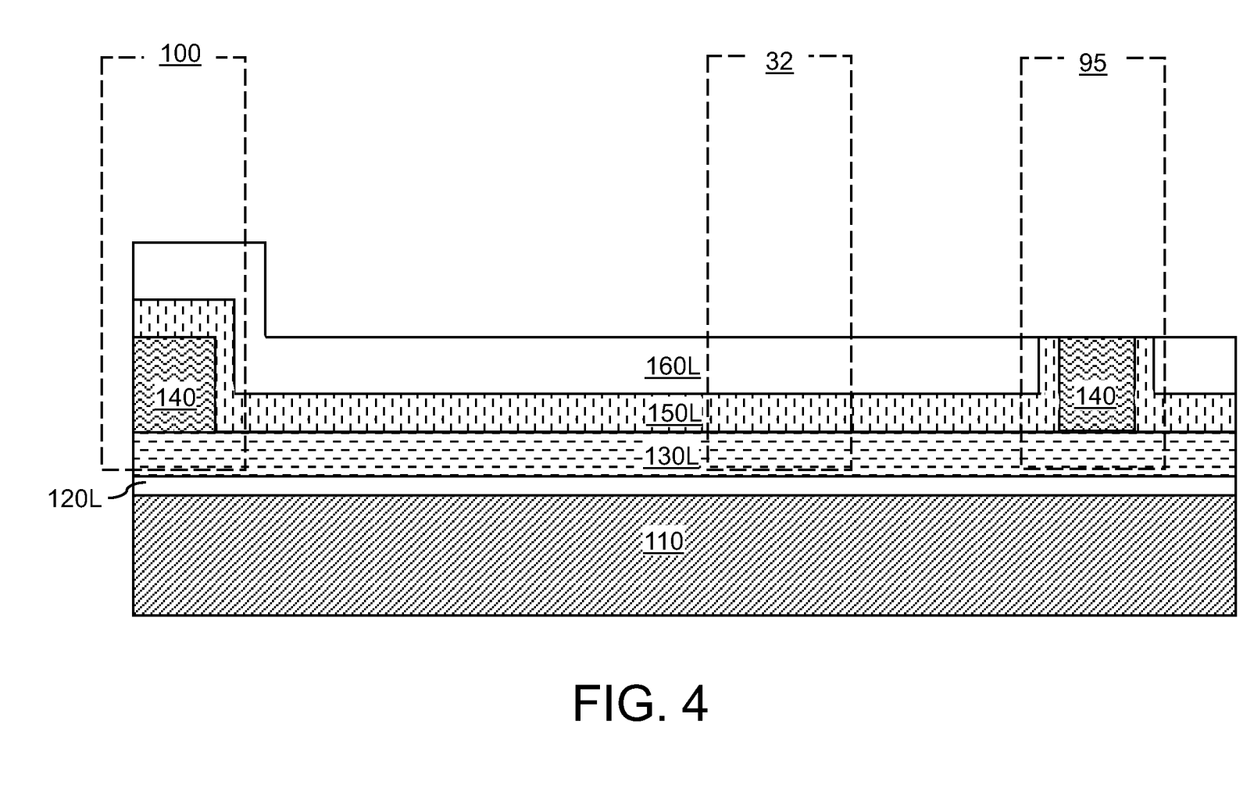

Referring to FIG. 4, a photoresist (not shown) is applied over the top surface of the second dielectric material layer 160L and lithographically patterned to expose regions of the second dielectric material layer 160L that overlie the first conductive material portions 140 that are not located within the region of the enclosure sidewall 100. The exposed portions of the second dielectric material layer 160L and the portion of the first dielectric material layer 150L located directly underneath are recessed by a recess etch so that the top surfaces of the first conductive material portions 140 are exposed.

Figure 5:
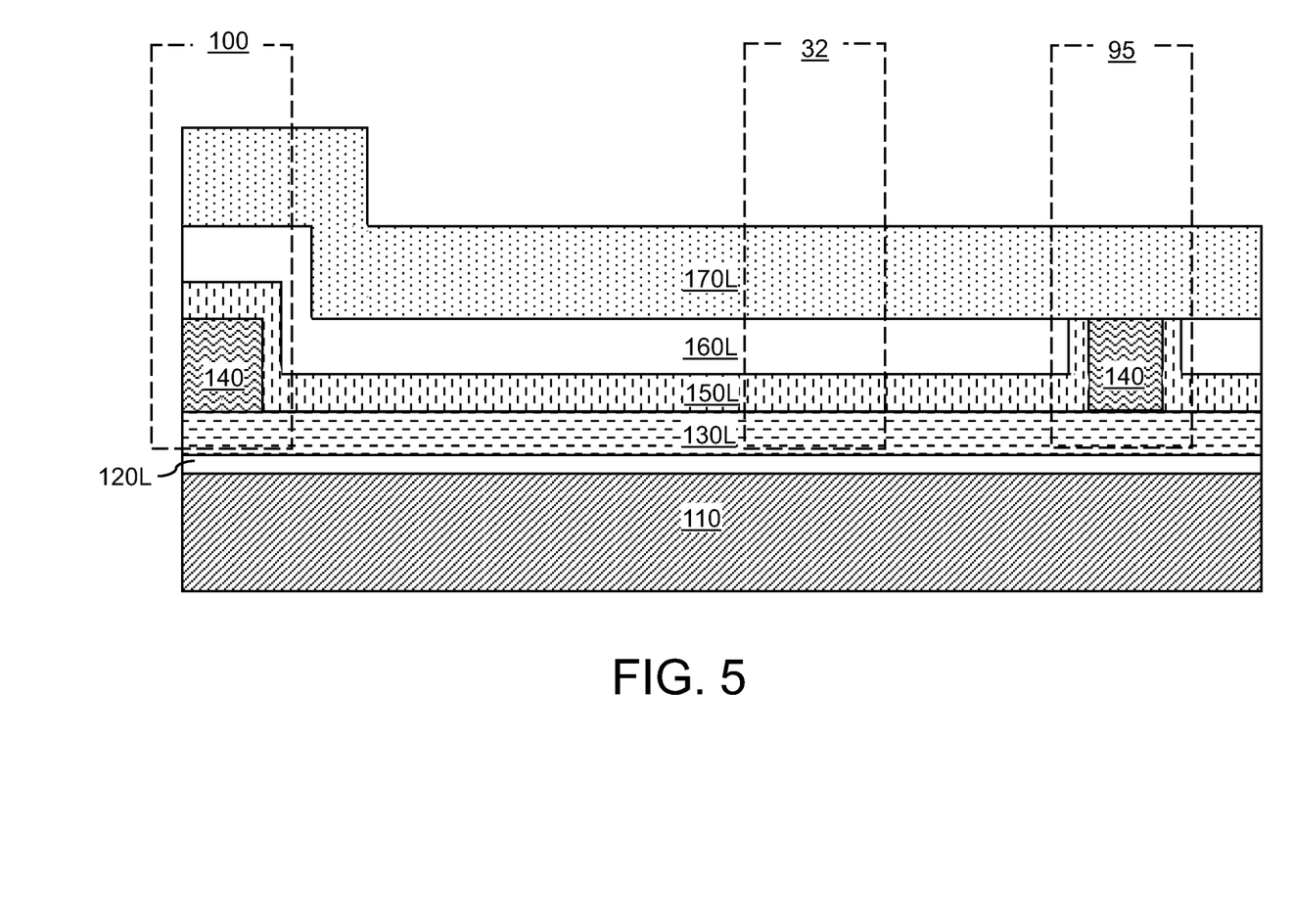

Referring to FIG. 5, a second conductive material layer 170L is deposited over the second dielectric material layer 160L and the exposed portions of the first conductive material portions 140. The second conductive material layer 170L comprise a second conductive material, which is the same as the second conductive material of the second conductive portions of the exemplary MEMS temperature sensor of FIG. 1 described above. For example, the second conductive material may be doped polysilicon or a metal. The thickness of the second conductive material layer may be from about 50 nm to about 5,000 nm, and typically from about 100 nm to about 500 nm, although lesser and greater thicknesses are also contemplated herein.

Figure 6:
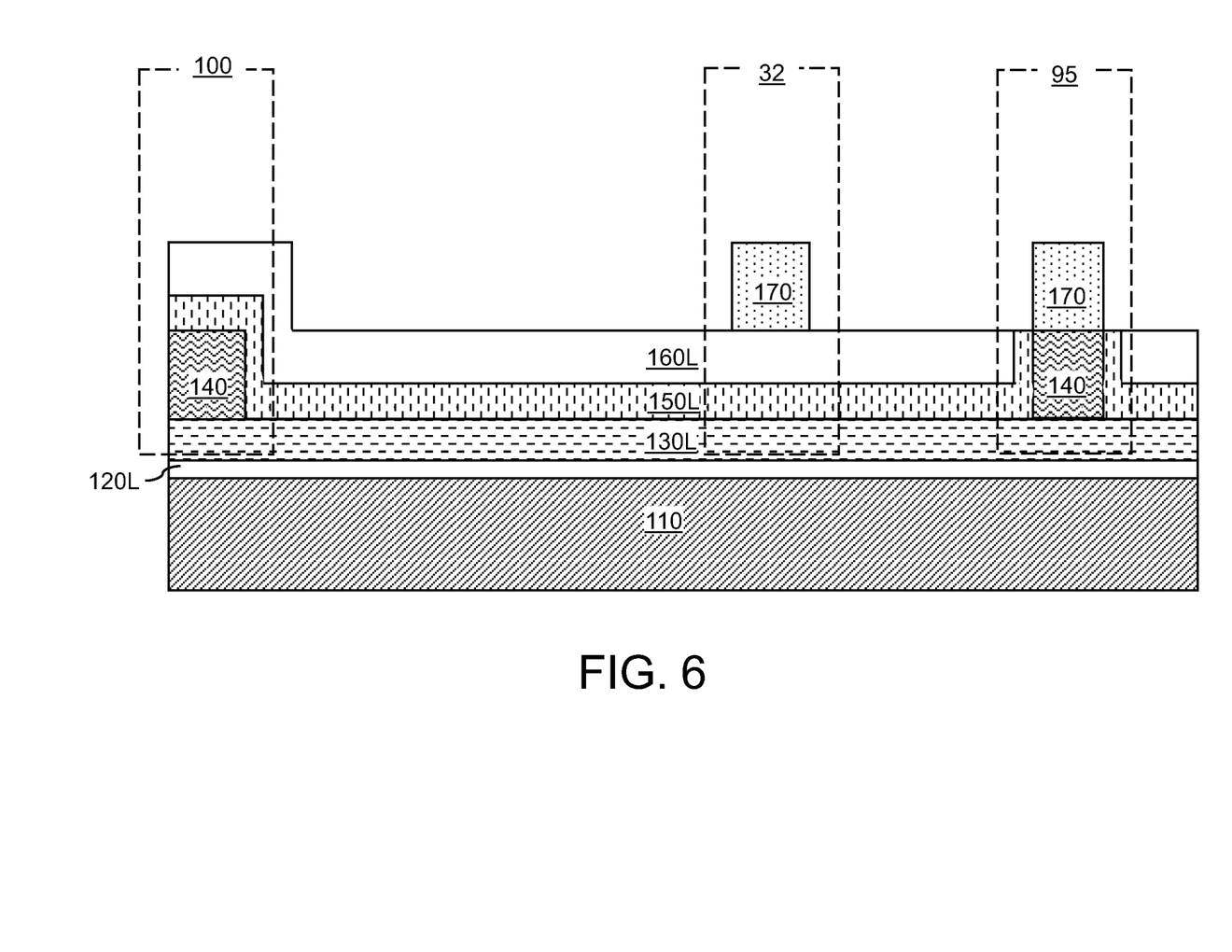

Referring to FIG. 6, the second conductive material layer 170L is lithographically patterned to form second conductive material portions 170, which are the same as the second conductive material portions in the exemplary MEMS temperature sensor of FIG. 1 described above. Two types of second conductive material portions 170 are formed. Each second conductive material portion 170 within a first subset of the second conductive material portions 170 vertically abuts one of the first conductive material portions 140. Each second conductive material portion 170 within a second subset of the second conductive material portions 170 does not overlie the first conductive material portions 140.

The first subset of the second conductive material portions 170 includes upper portions of all fixed structures of the exemplary MEMS temperature sensor of FIG. 1, including the spiral center post 10, the at least one guide post 20, the pivot structure 30, the paw post 50, the ratchet reset electrode 60, the at least one support spring post 70, the first through fifth conductive straps (91, 93, 95, 97, 99), and the first through fifth conductive pads (90, 92, 94, 96, 98). The second subset of the second conductive material portions 170 includes all suspended portions of the exemplary MEMS temperature sensor of FIG. 1, including the suspended spiral 12, the actuator (32, 34, 42, 44, 46), the at least one first conductive stator azimuthal fin 84, the at least one second conductive stator azimuthal fin 86, the pawl 52, and the at least one suspension support spring 74. Each of the second conductive material portions 170 in the second subset directly overlies a portion of the second dielectric material layer 160L, and laterally abuts another second conductive material portion 170.

Figure 7:
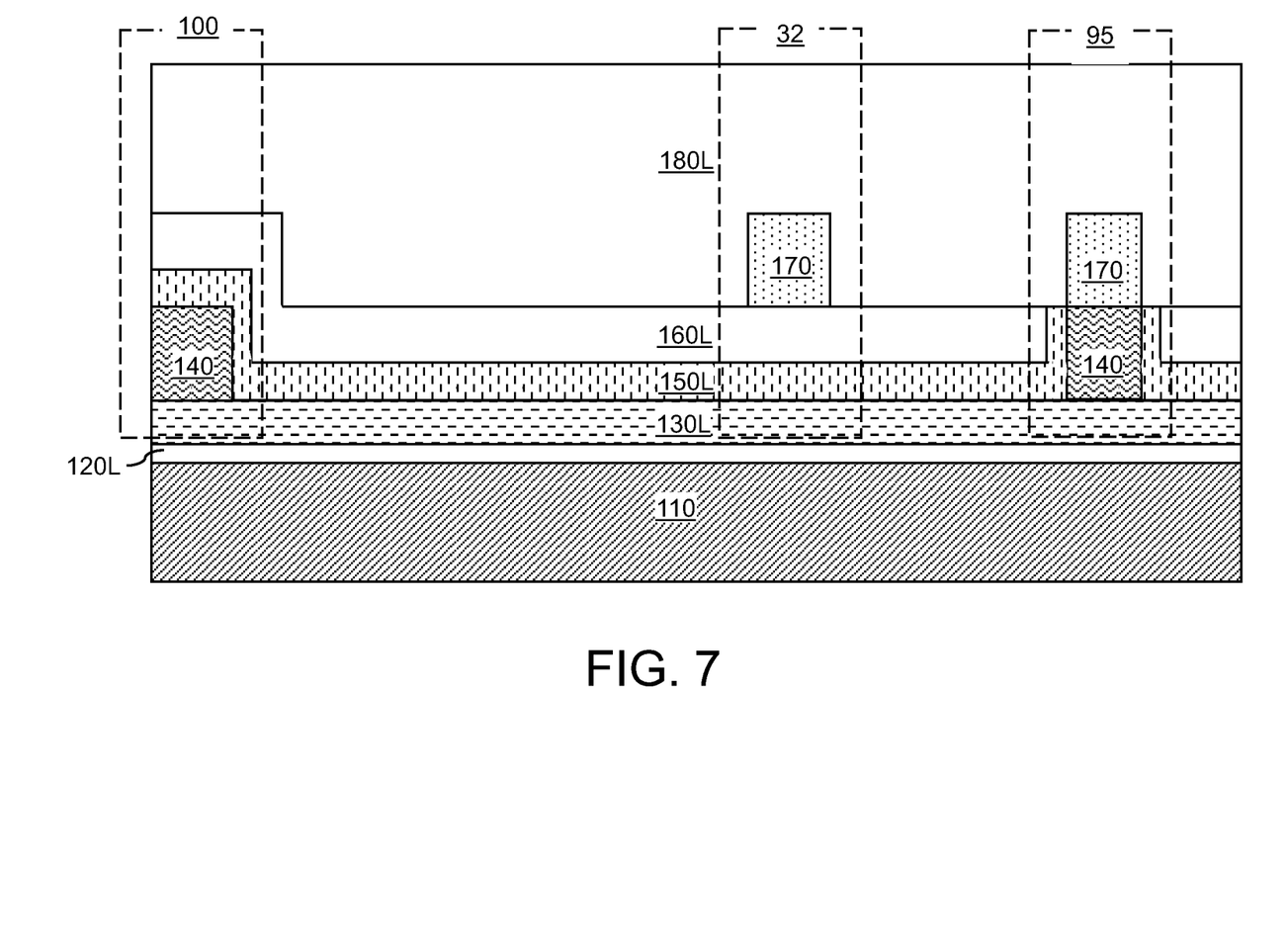

Referring to FIG. 7, a third dielectric material layer 180L is deposited over the second conductive material portions 170 and the exposed surfaces of the second dielectric material layer 160L. The third dielectric material layer 180L comprise a dielectric material that may be removed selective to the material of the etch stop dielectric material layer 150L by a wet etch. For example, the etch stop dielectric material layer 150L may comprise silicon nitride, and the second dielectric material layer 160L and the third dielectric material layer 180L may comprise silicon oxide. The thickness of the third dielectric material layer 180L may be from about 100 nm to about 5,000 nm, and typically from about 200 nm to about 2,000 nm, although lesser and greater thicknesses are also contemplated herein.

Figure 8:
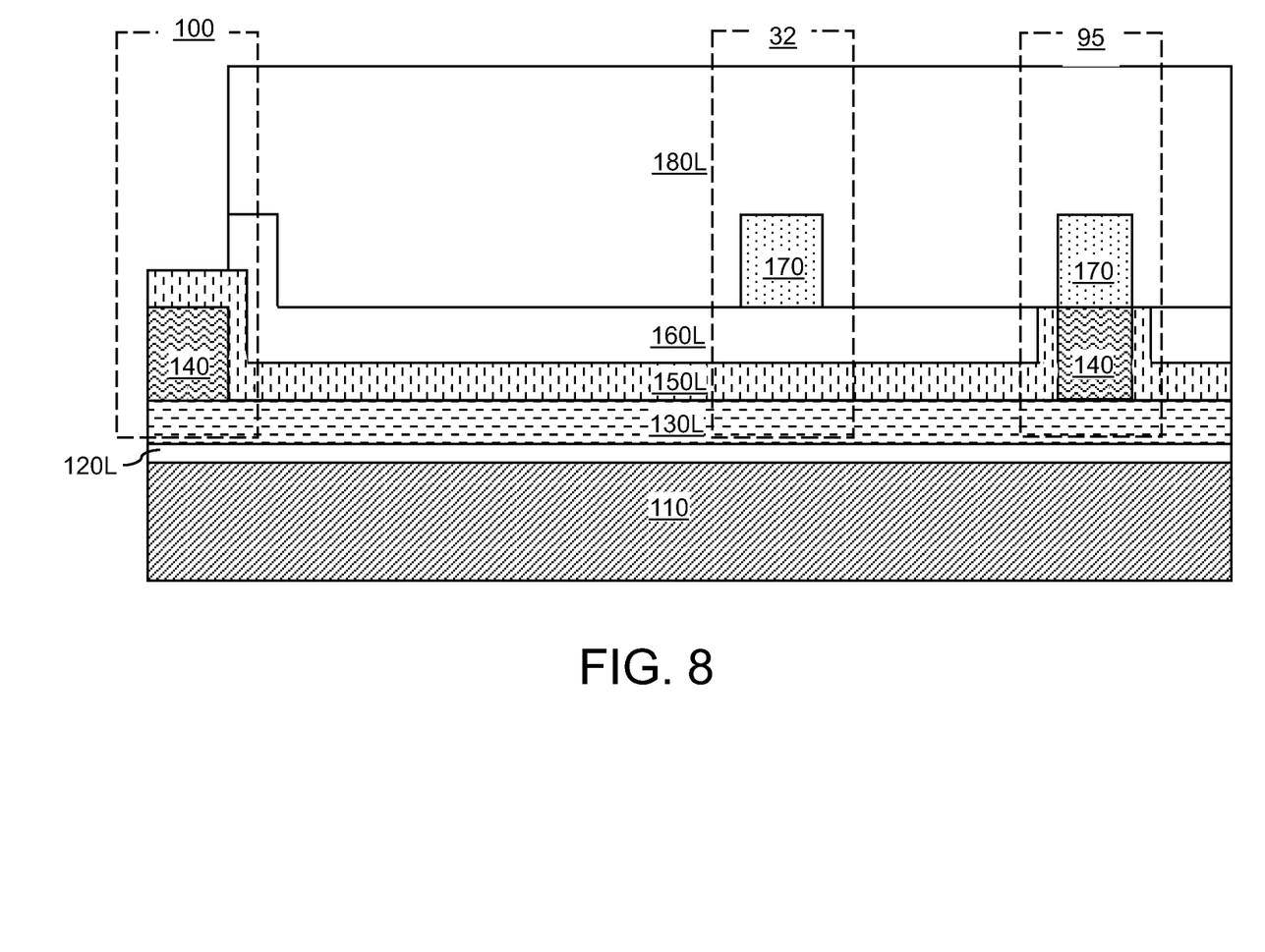

Referring to FIG. 8, a portion of the third dielectric material layer 180L may be removed by a combination of lithographic patterning and etch in the enclosure sidewall 100 to expose a top surface of the etch stop dielectric material layer 150L. The etch may be an anisotropic etch or an isotropic etch.

Figure 9:
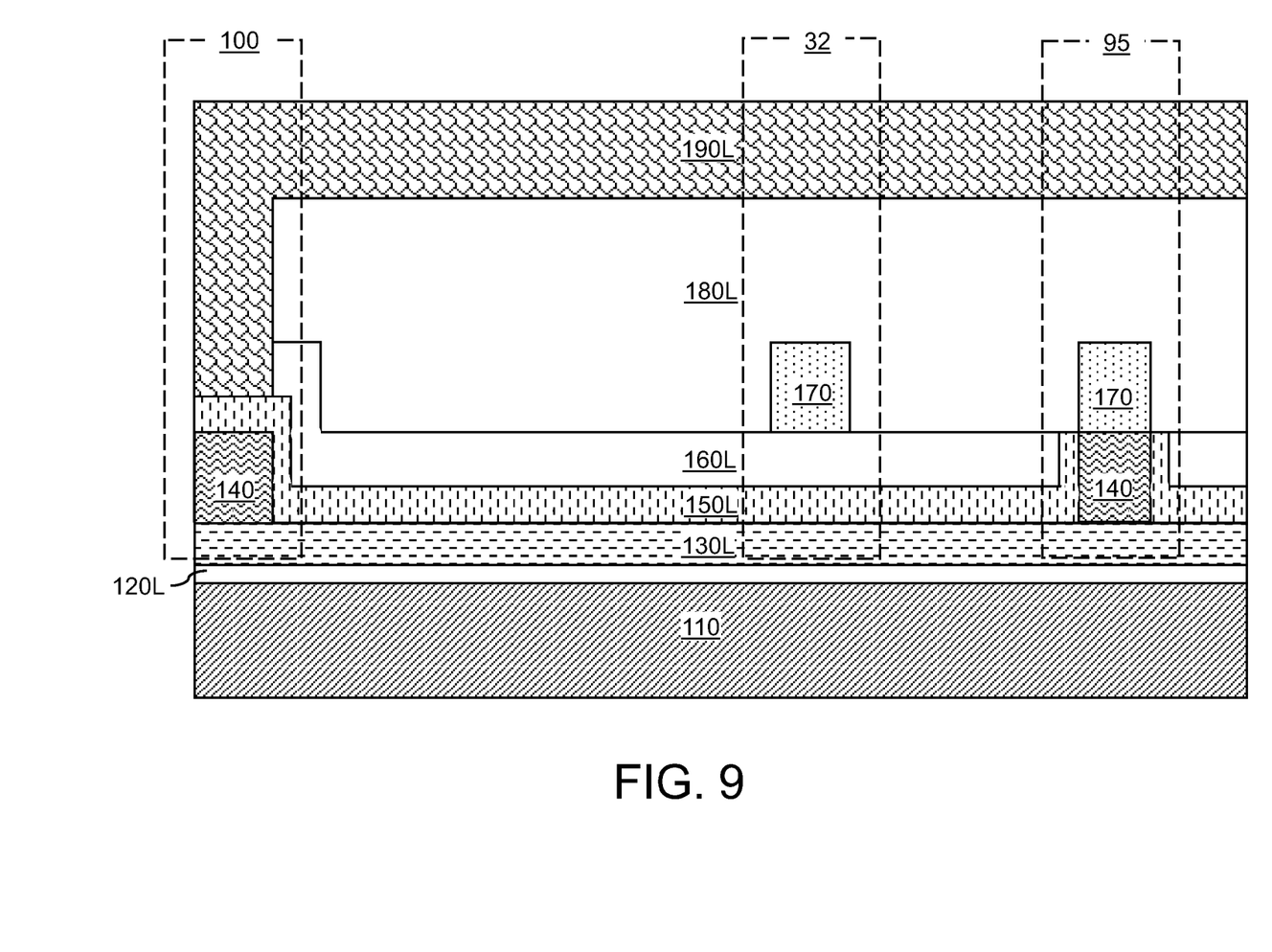

Referring to FIG. 9, an encapsulating material layer 190 on the third dielectric material layer 180L. The encapsulating material layer 190 is a material that is not etched by a wet etch to be subsequently employed to remove the third and second dielectric material layers (180L, 160L). The encapsulating material layer 190 may comprise an insulator material different from the material(s) of the second and third dielectric material layers (160L, 180L), a semiconductor material, or a metallic material. For example, the encapsulating material layer 190 may comprise doped or undoped polysilicon. The thickness of the encapsulating layer 190L may be from about 100 nm to about 2,000 nm, although lesser and greater thicknesses are also contemplated herein.

Figure 10:
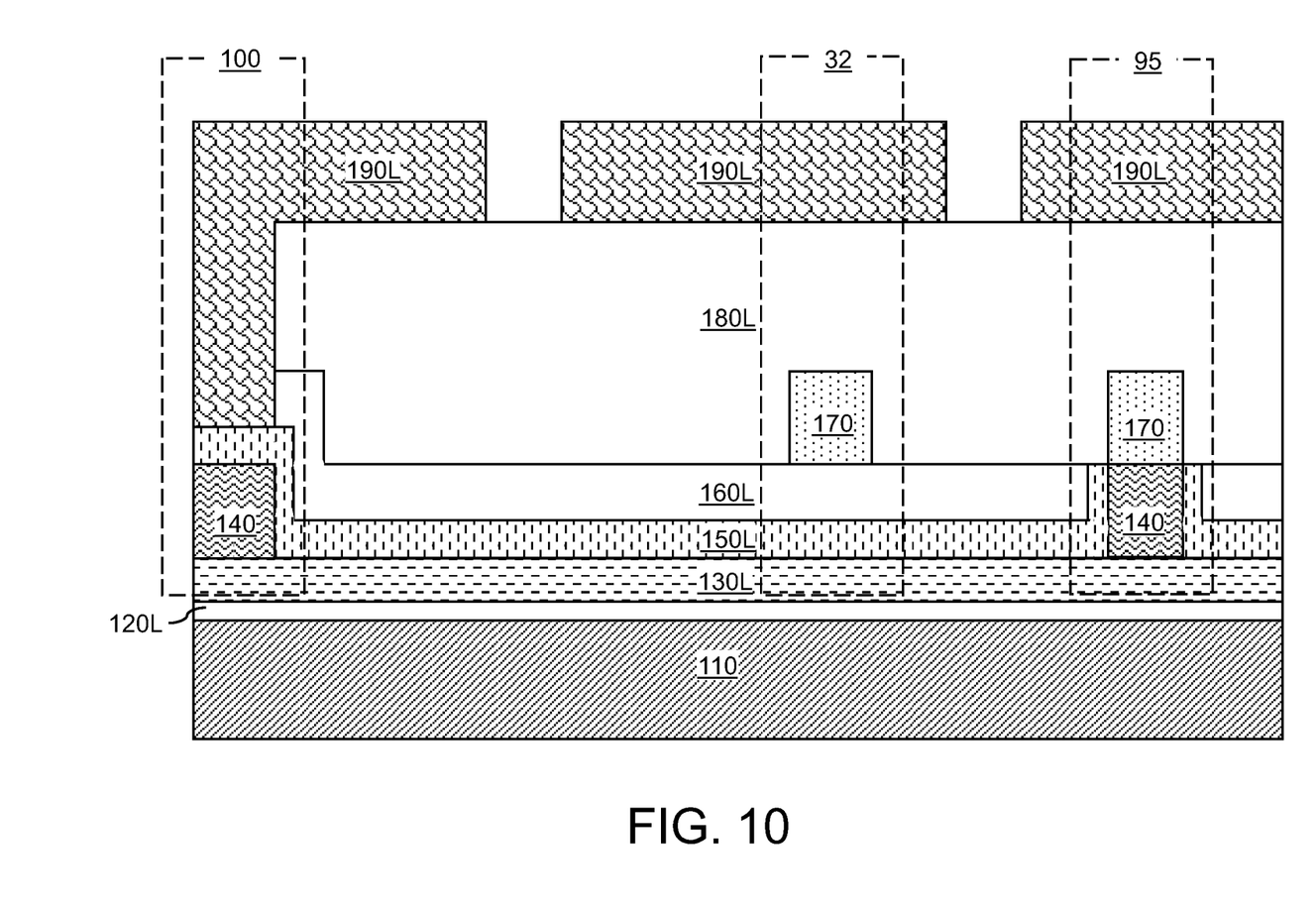

Referring to FIG. 10, at least one hole is formed within the portion of the encapsulating material layer 190 within the enclosure sidewall 100 by patterning of the encapsulating material layer 190L. The encapsulating material layer 190L may be patterned by applying a photoresist (not shown) above the top surface of the encapsulating material layer 190L, followed by lithographic patterning of the photoresist, and an etch that employs the remaining portion of the photoresist as an etch mask. In addition to forming a hole within the area surrounded by the enclosure sidewalls 100 in the exemplary MEMS temperature sensor of FIG. 1, the encapsulating material layer 190 is removed from above the area of the first through fifth conductive pads (90, 92, 94, 96, 98) in the exemplary MEMS temperature sensor of FIG. 1.

Figure 11:
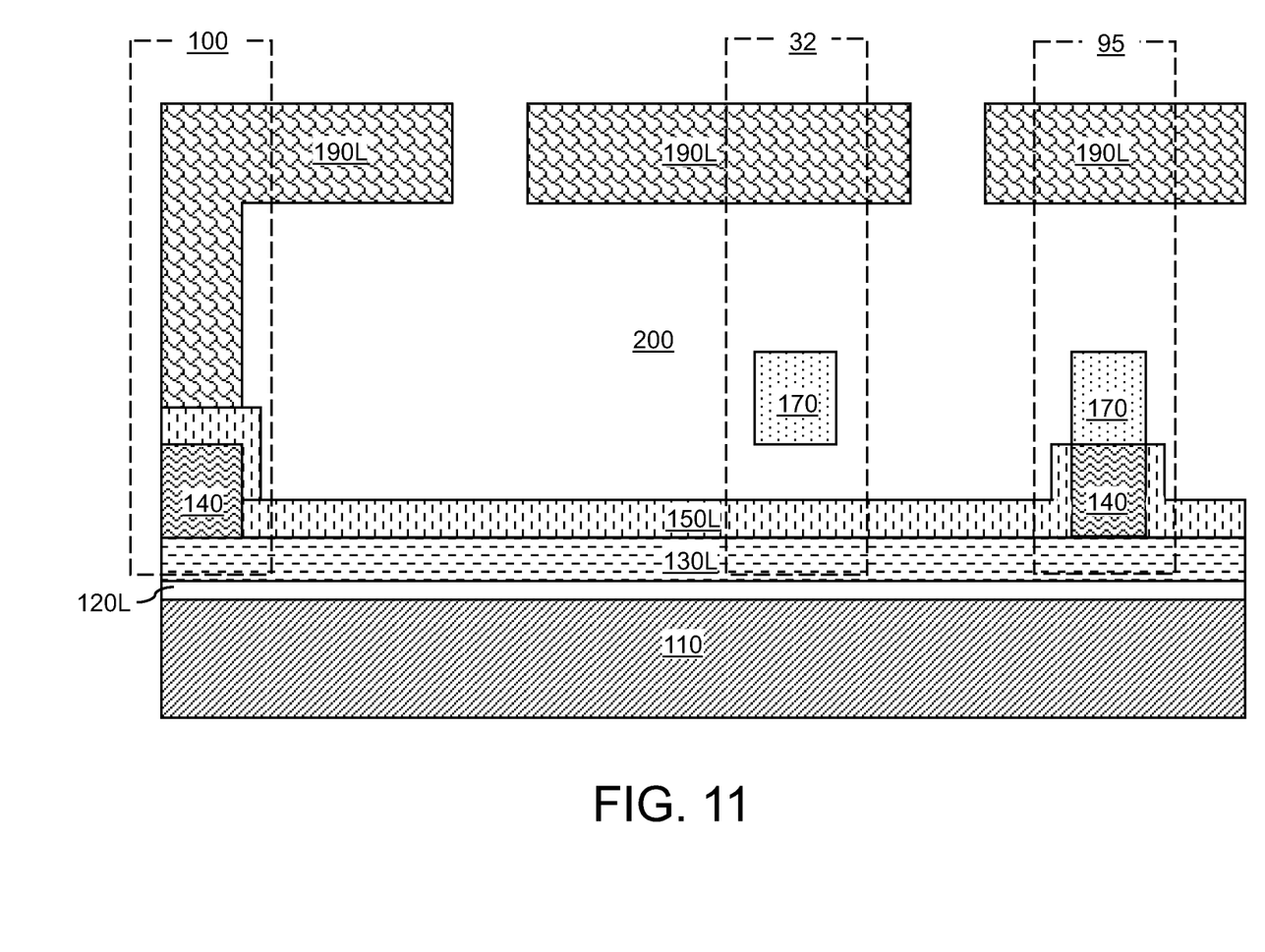

Referring to FIG. 11, a wet etch is performed to remove the third and second dielectric material layers (180L, 160L) selective to the second conductive material portions 170, the etch stop dielectric material layer 150L, and the encapsulating material layer 190L. In case the second and third dielectric material layers (160L, 180L) comprise silicon oxide and the first dielectric material layer 150L comprises silicon nitride, a wet etch employing hydrofluoric acid (HF) may be employed to remove the second and third dielectric material layers (160L, 180L) selective to the first dielectric material layer 150L. The second subset of the second conductive material portions 170, which includes all suspended portions of the exemplary MEMS temperature sensor of FIG. 1, are vertically separated from the substrate 110 by a portion of the cavity 200, which is formed within the volume bounded by the first dielectric material layer 150L and the encapsulating material layer 190L.

While the invention has been described in terms of specific embodiments, it is evident in view of the foregoing description that numerous alternatives, modifications and variations will be apparent to those skilled in the art. Accordingly, the invention is intended to encompass all such alternatives, modifications and variations which fall within the scope and spirit of the invention and the following claims.

What is claimed is:

1. A micro-electro-mechanical-structure (MEMS) temperature sensor comprising:
   a suspended spiral comprising a material having a positive thermal expansion coefficient, wherein a central end of said suspended spiral is fixed to a substrate and a peripheral end of said suspended spiral moves upon thermal expansion;
   an actuator configured to be azimuthally rotated about a pivot point by said peripheral end of said suspended spiral and including a set of at least one conductive rotor azimuthal fin; and
   a set of at least one conductive stator azimuthal fin that is fixed to said substrate, wherein capacitance between said set of at least one conductive rotor azimuthal fin and said set of at least one conductive stator azimuthal fin varies with an azimuthal rotation of said actuator.

2. The MEMS temperature sensor of claim 1, further comprising at least one guide post that guides said peripheral end of said suspended spiral to provide a linear movement of said peripheral end.

3. The MEMS temperature sensor of claim 1, further comprising:
   a first conductive pad electrically connected to said at least one conductive rotor azimuthal fin; and
   a second conductive pad electrically connected to said at least one conductive stator azimuthal fin.

4. The MEMS temperature sensor of claim 3, wherein a radial arm of said actuator and said set of at least one conductive rotor azimuthal fin are of integral and unitary construction, and wherein said pivot point is located in a pivot structure that is fixed to said substrate.

5. The MEMS temperature sensor of claim 1, wherein said set of at least one conductive rotor azimuthal fin and said set of at least one conductive stator azimuthal fin are interdigitated, and wherein all of said at least one conductive rotor azimuthal fin and said at least one conductive stator azimuthal fin have a same center of curvature.

6. The MEMS temperature sensor of claim 1, wherein said capacitance between said set of at least one conductive rotor azimuthal fin and said set of at least one conductive stator azimuthal fin increases with an increase in a rotational angle of said actuator.

7. The MEMS temperature sensor of claim 1, wherein said capacitance between said set of at least one conductive rotor azimuthal fin and said set of at least one conductive stator azimuthal fin decreases with an increase in a rotational angle of said actuator.

8. The MEMS temperature sensor of claim 1, further comprising:
   a ratchet located on an azimuthal fin attached to a radial arm of said actuator and comprising a set of asymmetrical teeth; and
   a pawl configured to allow a unidirectional motion of said ratchet and to stop said ratchet from moving in an opposite direction.

9. The MEMS temperature sensor of claim 7, further comprising:
   a pawl post attached to an end of said pawl and fixed to said substrate;
   a ratchet reset electrode located in proximity to said pawl; and
   another conductive pad resistively connected to said ratchet reset electrode.

10. The MEMS temperature sensor of claim 1, further comprising at least one suspension support spring attached to said actuator to reduce sagging of said actuator.

11. The MEMS temperature sensor of claim 1, further comprising an enclosure including a set of enclosure sidewalls, said substrate, and a top cover overlying said suspended spiral, said actuator, and said set of at least one conductive stator azimuthal fin.

12. The MEMS temperature sensor of claim 1, further comprising a capture cup located at an end portion of an azimuthal fin which is attached to a radial arm of said actuator, wherein a concave surface of said capture cup confines a lateral movement of said peripheral end of said suspended spiral.

13. The MEMS temperature sensor of claim 1, wherein said pivot point is located in a pivot structure including a vertical stack of a lower pivot structure comprising a first conductive material and an upper pivot structure comprising a second conductive material, wherein said pivot structure is fixed to said substrate, and wherein said suspended spiral, said set of at least one conductive rotor azimuthal fin, and said set of at least one conductive stator azimuthal fin comprise said second conductive material.

14. The MEMS temperature sensor of claim 13, wherein said second conductive material comprises a doped polysilicon, a doped silicon-containing semiconductor alloy, or a metallic material.

15. The MEMS temperature sensor of claim 14, further comprising a silicon nitride layer underlying said suspended spiral and vertically separated from said spiral.

* * * * *